US012352391B2

(12) United States Patent
Ko

(10) Patent No.: US 12,352,391 B2
(45) Date of Patent: Jul. 8, 2025

(54) HYDROGEN REFUELING SYSTEM AND CONTROL METHOD THEREOF

(71) Applicants: HYUNDAI MOTOR COMPANY, Seoul (KR); KIA CORPORATION, Seoul (KR)

(72) Inventor: Dong Seok Ko, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 197 days.

(21) Appl. No.: 18/137,058

(22) Filed: Apr. 20, 2023

(65) Prior Publication Data

US 2024/0117939 A1 Apr. 11, 2024

(30) Foreign Application Priority Data

Oct. 6, 2022 (KR) ........................ 10-2022-0128101

(51) Int. Cl.
*F17C 5/06* (2006.01)
*F17C 5/00* (2006.01)
*F17C 13/02* (2006.01)
*F17C 13/04* (2006.01)

(52) U.S. Cl.
CPC ................ *F17C 5/06* (2013.01); *F17C 5/007* (2013.01); *F17C 13/025* (2013.01); *F17C 13/04* (2013.01); *F17C 2221/012* (2013.01); *F17C 2227/0157* (2013.01); *F17C 2250/043* (2013.01); *F17C 2250/072* (2013.01); *F17C 2270/0139* (2013.01)

(58) Field of Classification Search
CPC .......... F17C 5/06; F17C 5/007; F17C 13/025; F17C 2221/012; F17C 2227/0157; F17C 2250/043; F17C 2250/072
See application file for complete search history.

(56) References Cited

U.S. PATENT DOCUMENTS

2017/0336028 A1* 11/2017 Cohen ..................... F17C 13/04
2020/0309323 A1* 10/2020 Elgowainy ............. F17C 5/007
2021/0013527 A1 1/2021 You et al.
2021/0396356 A1* 12/2021 Charbonneau ............ F17C 7/00
2023/0204159 A1* 6/2023 Werlen ................. F17C 13/025 141/5

FOREIGN PATENT DOCUMENTS

JP 2004-116544 A 4/2004
JP 2012-237437 A 12/2012
JP 2015-197190 A 11/2015
KR 2009-0027848 A 3/2009
KR 10-2237244 B1 4/2021
KR 2021-0094168 A 7/2021

* cited by examiner

*Primary Examiner* — Jason K Niesz
(74) *Attorney, Agent, or Firm* — MCDONNELL BOEHNEN HULBERT & BERGHOFF LLP

(57) ABSTRACT

A hydrogen refueling system includes a first vessel that stores hydrogen generated by a hydrogen generator, a first compressor that compresses the hydrogen generated by the first vessel, a second vessel that stores the hydrogen compressed by the first compressor, a hydrogen supply valve positioned between the first vessel and the second vessel, and a controller that identifies a pressure of the first vessel based on whether a charging target initiates charging and that the first compressor operates, and controls the hydrogen supply valve to supply the hydrogen from the second vessel to the first vessel, based on whether the pressure of the first vessel is less than or equal to set pressure.

20 Claims, 6 Drawing Sheets

HYDROGEN REFUELING SYSTEM AND CONTROL METHOD THEREOF

CROSS REFERENCE TO RELATED APPLICATIONS

This application claims the benefit of priority to Korean Patent Application No. 10-2022-0128101, filed in the Korean Intellectual Property Office on Oct. 6, 2022, the entire contents of which are incorporated herein by reference.

TECHNICAL FIELD

The present disclosure relates to a hydrogen refueling system linked with a reformer and a control method thereof.

BACKGROUND

Hydrogen charging stations are classified into an off-site scheme and an on-site scheme according to a hydrogen supply scheme. The off-site scheme is a scheme which supplies hydrogen produced by a factory to a pipeline and a tube trailer, and the on-side scheme is a scheme which produces and supplies hydrogen by means of reforming, electrolysis, and the like in the charging station.

A compressor in hydrogen refueling facility in the on-site scheme, that is, hydrogen refueling facility with which a reformer is linked is connected with a low pressure vessel (or a hydrogen storage tank) to supply hydrogen to a medium pressure vessel and a high pressure vessel. When the low pressure vessel is charged 100%, the reformer runs in a standby mode. When hydrogen starts to be supplied to the vehicle, pressure of the medium pressure vessel and the high pressure vessel may decrease. To recover pressure of the medium pressure vessel and the high pressure vessel, while charging is being performed or after the charging is completed, the compressor supplies hydrogen, introduced from the low pressure vessel, to the medium pressure vessel and the high pressure vessel.

When the low pressure vessel is fully charged (i.e., when the low pressure vessel is charged 100%) and when the reformer is running in the standby mode, pressure of the low pressure vessel sharply decreases at the same time as operating the compressor. This means that inlet pressure of the compressor decreases. Because it is possible for the compressor to normally run only when the inlet pressure is constant or is kept greater than or equal to specific pressure, it operates a bypass valve of the compressor to perform running for compensating for the inlet pressure, when the inlet pressure of the compressor decreases. When hydrogen discharged from the compressor is bypassed to a front stage (or an input stage) of the compressor to compensate for the inlet pressure of the compressor, the amount of hydrogen supplied to the medium and high pressure vessels decreases. This increases a recovery time for charging.

SUMMARY

The present disclosure has been made to solve the above-mentioned problems occurring in the prior art while advantages achieved by the prior art are maintained intact.

An aspect of the present disclosure provides a hydrogen refueling system for decreasing a recovery time of hydrogen refueling facility linked with a reformer, that is, a standby time for charging and a control method thereof.

Another aspect of the present disclosure provides a hydrogen refueling system for preventing pressure of a low pressure vessel from being degraded until a reformer normally operates and a control method thereof.

Another aspect of the present disclosure provides a hydrogen refueling system for preventing pressure at a front stage of a compressor from being degraded when a reformer does not operate and a control method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a hydrogen refueling system may include a first vessel that stores hydrogen generated by a hydrogen generator, a first compressor that compress the hydrogen generated by the first vessel, a second vessel that stores the hydrogen compressed by the first compressor, a hydrogen supply valve positioned between the first vessel and the second vessel, and a controller that identifies pressure of the first vessel based on whether a charging target initiates charging and that the first compressor operates, and controls the hydrogen supply valve to supply the hydrogen from the second vessel to the first vessel based on whether the pressure of the first vessel is less than or equal to set pressure.

The hydrogen refueling system may further include a first valve disposed between the hydrogen supply valve and the second vessel.

The controller may determine whether it is possible to supply the hydrogen from the second vessel to the first vessel based on pressure of the second vessel and may open the first valve such that the hydrogen of the second vessel is returned to the first vessel in response to determining that it is possible to supply the hydrogen from the second vessel to the first vessel.

The controller may identify whether the pressure of the first vessel reaches a hydrogen supply valve closing pressure and may close the hydrogen supply valve and the first valve in response to identifying that the pressure of the first vessel reaches the hydrogen supply valve closing pressure.

The hydrogen refueling system may further include a second compressor that compresses the hydrogen stored in n the second vessel, a third vessel that stores the hydrogen compressed by the second compressor, and a second valve disposed between the third vessel and the hydrogen supply valve.

The controller may determine whether it is possible to supply hydrogen from the third vessel to the first vessel based on a pressure of the third vessel and may open the second valve such that the hydrogen of the third vessel is returned to the first vessel in response to determining that it is possible to supply the hydrogen from the third vessel to the first vessel.

The controller may identify whether the pressure of the first vessel reaches a hydrogen supply valve closing pressure and may close the hydrogen supply valve and the second valve in response to identifying that the pressure of the first vessel reaches the hydrogen supply valve closing pressure.

The hydrogen refueling system may further include a hydrogen storage tank connected with a rear stage of the first compressor and a front stage of the second vessel, a third valve disposed between the first compressor the second vessel, and a fourth valve disposed between the first compressor and the hydrogen storage tank.

The controller may open the third valve and may close the fourth valve to be closed to supply the hydrogen compressed by the first compressor to the second vessel based on whether the first compressor operates.

The controller may determine whether the charging of the charging target is completed based on whether the hydrogen generator is operating, may close the third valve to block hydrogen from being supplied to the second vessel in response to determining that the charging of the charging target is completed, may open the fourth valve to supply the hydrogen compressed by the first compressor to the hydrogen storage tank, and may control the hydrogen supply valve based on pressure of the hydrogen storage tank.

According to another aspect of the present disclosure, a control method of a hydrogen refueling system including a first vessel that stores hydrogen generated by a hydrogen generator, a first compressor that compresses the hydrogen introduced from the first vessel, and a second vessel that stores the hydrogen compressed by the first compressor may include identifying a pressure of the first vessel based on whether a charging target initiates charging and whether the first compressor operates, determining whether the pressure of the first vessel is less than or equal to a set pressure, and controlling a hydrogen supply valve positioned between the first vessel and the second vessel such that the hydrogen is supplied from the second vessel to the first vessel in response to determining that the pressure of the first vessel is less than or equal to the set pressure.

The control method may further include determining whether it is possible to supply the hydrogen from the second vessel to the first vessel based on a pressure of the second vessel, returning the hydrogen of the second vessel to the first vessel in response to determining that it is possible to supply the hydrogen from the second vessel to the first vessel, identifying whether the pressure of the first vessel reaches a hydrogen supply valve closing pressure, and closing the hydrogen supply valve and a first valve in response to determining that the pressure of the first vessel reaches the hydrogen supply valve closing pressure.

The returning of the hydrogen of the second vessel to the first vessel may include opening the first valve positioned between the hydrogen supply valve and the second vessel.

The control method may further include determining whether it is possible to supply hydrogen from a third vessel connected with a rear stage of a second compressor configured to compress the hydrogen discharged from the second vessel and configured to store hydrogen compressed by the second compressor to the first vessel based on pressure of the third vessel, returning the hydrogen of the third vessel to the first vessel in response to determining that it is possible to supply the hydrogen from the third vessel to the first vessel, identifying whether the pressure of the first vessel reaches a hydrogen supply valve closing pressure, and closing the hydrogen supply valve and a second valve in response to identifying that the pressure of the first vessel reaches the hydrogen supply valve closing pressure.

The returning of the hydrogen of the third vessel to the first vessel may include opening the second valve disposed between the hydrogen supply valve and the third vessel.

The control method may further include initiating to supply the hydrogen compressed by the first compressor to the second vessel based on that the first compressor operates, identifying whether the hydrogen generator is operating, determining whether the charging of the charging target is completed in response to identifying that the hydrogen generator is operating, blocking hydrogen from being supplied to the second vessel in response to determining that the charging of the charging target is completed, supplying the hydrogen compressed by the first compressor to a hydrogen storage tank disposed between a rear stage of the first compressor and the hydrogen supply valve, and blocking the hydrogen from being supplied to the hydrogen storage tank based on a pressure of the hydrogen storage tank.

The initiating to supply the hydrogen to the second vessel may include opening a third valve positioned between the first compressor and the second vessel based on whether the first compressor operates, and closing a fourth valve located between the rear stage of the first compressor and the hydrogen storage tank.

The blocking of the hydrogen from being supplied to the second vessel may include closing the third valve.

The supplying of the hydrogen to the hydrogen storage tank may include opening the fourth valve.

The control method may further include controlling the hydrogen supply valve based on the pressure of the hydrogen storage tank.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
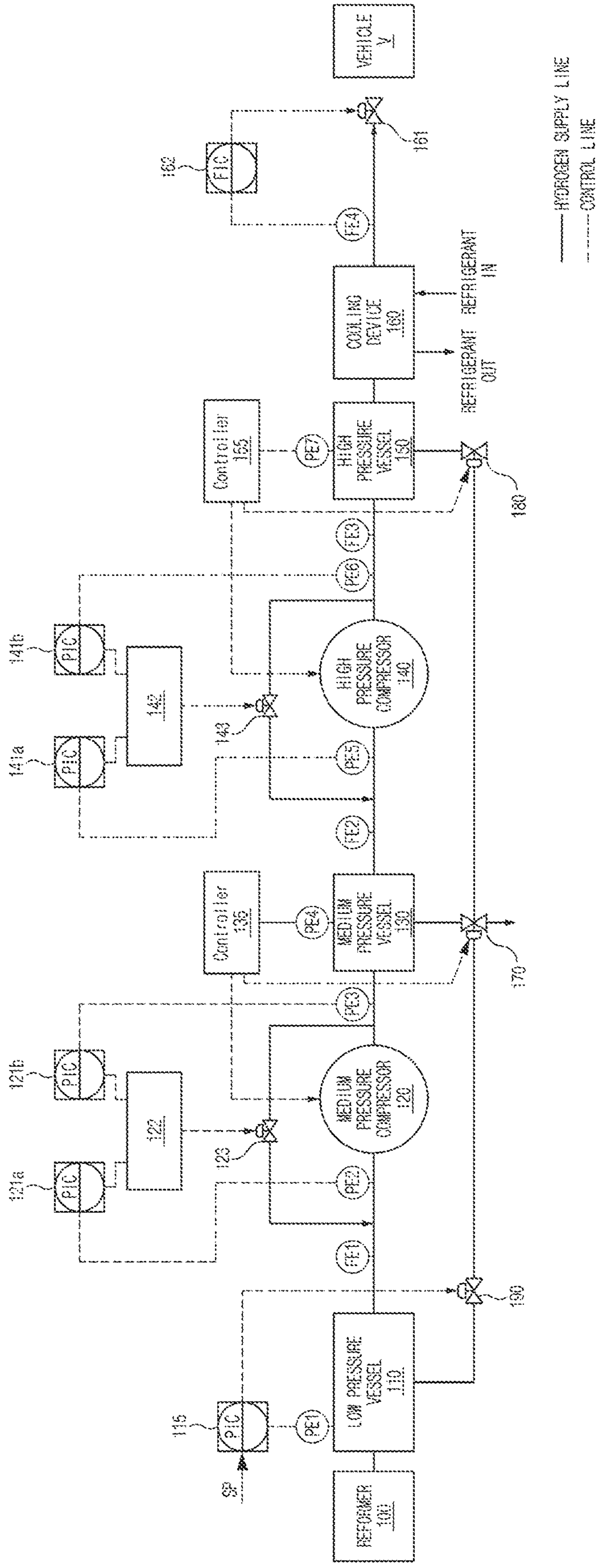
FIG. 1 is a drawing illustrating a configuration of a hydrogen refueling system according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Low pressure, medium pressure, and high pressure in the specification may be set values predetermined by a manager, a designer, and/or the like of a hydrogen refueling system. For example, the low pressure may be 8 bar, the medium pressure may be 450 bar, and the high pressure may be 900 bar.

FIG. 1 is a drawing illustrating a configuration of a hydrogen refueling system according to an embodiment of the present disclosure.

The hydrogen refueling system may be an on-site scheme system linked with a hydrogen generator. Referring to FIG. 1, the hydrogen refueling system may include a reformer 100, a low pressure vessel 110, a medium pressure compressor 120, a medium pressure vessel 130, a high pressure compressor 140, a high pressure vessel 150, a cooling device 160, a first valve 170, a second valve 180, and a hydrogen supply valve 190.

The reformer 100 is a hydrogen generator which generates (or produces) hydrogen (e.g., hydrogen gas $H_2$) by using hydrocarbons (or methane) and water vapor as raw materials. The reformer 100 may generate low pressure (or first pressure) hydrogen. City gas, liquefied petroleum gas (LPG), and/or the like may be used as the hydrocarbons. When the low pressure vessel 110 is charged 100%, the reformer 100 may run in a standby mode.

The low pressure vessel (or the first vessel) 110 may be a hydrogen storage tank which stores the low pressure hydrogen produced by the reformer 100. The low pressure vessel 110 may be equipped with a first pressure sensor or element PE1 which measures pressure of hydrogen in the low pressure vessel 110 (or low pressure vessel pressure). Because the pressure of the medium pressure vessel 130 and/or the high pressure vessel 150 decreases when hydrogen starts to be supplied to a charging target (e.g., a hydrogen electric vehicle or the like), the hydrogen of the low pressure vessel 110 may be supplied to the medium pressure vessel 130 and/or the high pressure vessel 150 to recover the pressure of the medium pressure vessel 130 and/or the high pressure vessel 150 while refueling is performed or after the refueling is completed.

A first pressure indicator controller (PIC) 115 may control pressure of hydrogen in the low pressure vessel 110. The first PIC 115 may compare the hydrogen pressure measured by the first pressure element PE1 with set pressure SP. The set pressure SP may be preset by a manager or a designer of the hydrogen refueling system. When the hydrogen pressure measured by the first pressure element PE1 is less than or equal to the set pressure SP, the first PIC 115 may determine to supply hydrogen to the low pressure vessel 110. When it is determined to supply the hydrogen, the first PIC 115 may control the hydrogen supply valve 190 to be opened, such that the hydrogen is supplied to the low pressure vessel 110. At this time, the first PIC 115 may control an opening amount of the hydrogen supply valve 190 based on the hydrogen pressure measured by the first pressure element PE1.

The first PIC 115 may include a processor. The processor may be implemented as an application specific integrated circuit (ASIC), a digital signal processor (DSP), a programmable logic device (PLD), a field programmable gate array (FPGA), a central processing unit (CPU), a microcontroller, a microprocessor, and/or the like. The first PIC 115 may include a memory. The memory may be a non-transitory storage medium which stores instructions executed by the processor. The memory may be implemented as a flash memory, a hard disk, a solid state disk (SSD), a random access memory (RAM), a static RAM (SRAM), a read only memory (ROM), a programmable ROM (PROM), an electrically erasable and programmable ROM (EEPROM), an erasable and programmable ROM (EPROM), and/or the like.

The medium pressure compressor (or the first compressor) 120 may compress the low pressure hydrogen introduced (or entered) from the low pressure vessel 110 to medium pressure (or second pressure) hydrogen. In other words, the medium pressure compressor 120 may be a device which compresses (or converts) the pressure of hydrogen in the hydrogen refueling system into predetermined pressure (e.g., medium pressure). A first flow sensor or flow element (FE1) and/or a second pressure element PE2 may be mounted (or disposed) at a front stage of the medium pressure compressor 120. The third pressure element PE3 may be mounted on a rear stage of the medium pressure compressor 120.

A second PIC 121*a* which controls hydrogen pressure at the front stage of the medium pressure compressor 120 and a third PIC 121*b* which controls hydrogen pressure at the rear stage of the medium pressure compressor 120 may be connected with the medium pressure compressor 120. The second PIC 121*a* may control hydrogen pressure at the front stage of the medium pressure compressor 120 based on the hydrogen pressure at the front stage, which is measured by the second pressure element PE2. The second PIC 121*a* may output a valve opening amount (or a control value) according to the hydrogen pressure at the front stage of the medium pressure compressor 120. The third PIC 121*b* may control hydrogen pressure at the rear stage of the medium pressure compressor 120 based on the hydrogen pressure at the rear stage, which is measured by the third pressure element PE3. The third PIC 121*b* may output a valve opening amount according to the hydrogen pressure at the rear stage of the medium pressure compressor 120.

A first selector 122 may be connected with the second PIC 121*a* and the third PIC 121*b*. The first selector 122 may select a larger value among output values output from the second PIC 121*a* and the third PIC 121*b*. In other words, the first selector 122 may select and output a larger valve opening amount between the valve opening amount output from the second PIC 121*a* and the valve opening amount output from the third PIC 121*b*. Each of the second PIC 121*a* and the third PIC 121*b* may include a processor and a memory.

The first pressure control valve 123 may be connected with the first selector 122. The first pressure control valve 123 may be installed on a bypass line connected with the rear stage of the medium pressure compressor 120 to the front stage of the medium pressure compressor 120. The first pressure control valve 123 may adjust its opening amount depending on the valve opening amount output from the first selector 122 and may control the amount of hydrogen bypassed from the rear stage of the medium pressure compressor 120 to the front stage of the medium pressure compressor 120. The first pressure control valve 123 may control the hydrogen pressure at the front stage of the medium pressure compressor 120 and the hydrogen pressure at the rear stage of the medium pressure compressor 120 by adjusting the opening amount of the first pressure control valve 123.

The medium pressure vessel (or the second vessel) 130 may store medium pressure (e.g., 450 bar) hydrogen compressed by the medium pressure compressor 120. The medium pressure vessel 130 may be equipped with a fourth pressure element PE4 which measures pressure of hydrogen in the medium pressure vessel 130.

A first compressor controller (or a first controller) 135 may control capacity of the medium pressure compressor 120 based on the pressure of the hydrogen in the medium pressure vessel 130 (or medium pressure vessel pressure), which is measured by the fourth pressure element PE4. The first compressor controller 135 may control compressor capacity by controlling revolutions per minute (RPM), a guide vane, a sliding valve, or the like of the medium pressure compressor 120. The compressor controller 135 may include a processor and a memory.

The high pressure compressor (or the second compressor) 140 may compress the medium pressure hydrogen introduced from the medium pressure vessel 130 to high pressure (or third pressure) hydrogen. In other words, the high pressure compressor 140 may be a device which compresses the hydrogen in the hydrogen refueling system to high pressure (e.g., 875 bar). A second flow element FE2 and/or a fifth pressure element PE5 may be installed at a front stage of the high pressure compressor 140. A sixth pressure element PE6 and/or a third flow element FE3 may be mounted on a rear stage of the high pressure compressor 140.

A fourth PIC 141*a* which controls hydrogen pressure at the front stage of the high pressure compressor 140 and a fifth PIC 141*b* which controls hydrogen pressure at the rear stage of the high pressure compressor 140 may be connected with the high pressure compressor 140. The fourth PIC 141*a* may control hydrogen pressure at the front stage of the high pressure compressor 140 based on the hydrogen pressure measured by the fifth pressure element PE5. The fourth PIC 141*a* may output a valve opening amount according to the hydrogen pressure at the front stage of the high pressure compressor 140. The fifth PIC 141*b* may control hydrogen pressure at the rear stage of the high pressure compressor 140 based on the hydrogen pressure measured by the sixth pressure element PE6. The fifth PIC 141*b* may output a valve opening amount according to the hydrogen pressure at the rear stage of the high pressure compressor 140.

A second selector 142 may be connected with the fourth PIC 141*a* and the fifth PIC 141*b*. The second selector 142 may select a larger value among output values output from the fourth PIC 141*a* and the fifth PIC 141*b*. In other words, the second selector 142 may select and output a larger valve opening amount between the valve opening amount output from the fourth PIC 141*a* and the valve opening amount output from the fifth PIC 141*b*. Each of the fourth PIC 141*a* and the fifth PIC 141*b* may include a processor and a memory.

A second pressure control valve 143 may be connected with the second selector 142. The second pressure control valve 143 may be installed on a bypass line connected from the rear stage of the high pressure compressor 140 to the front stage of the high pressure compressor 140. The second pressure control valve 143 may adjust its opening amount depending on the valve opening amount output from the second selector 142. The second pressure control valve 143 may control the hydrogen pressure at the front stage of the high pressure compressor 140 and the hydrogen pressure at the rear stage of the high pressure compressor 140 by adjusting the opening amount of the second pressure control valve 143.

The high pressure vessel (or the third vessel) 150 may store the high pressure hydrogen compressed by the high pressure compressor 140. The high pressure vessel 150 may be equipped with a seventh pressure element PE7 which measures pressure of hydrogen in the high pressure vessel 150 (or high pressure vessel pressure).

A second compressor controller (or a second controller) 155 may control capacity of the high pressure compressor 140 based on the pressure of the hydrogen in the high pressure vessel 150, which is measured by the seventh pressure element PE7. The second compressor controller 155 may control compressor capacity by controlling RPM, a guide vane, a sliding valve, or the like of the high pressure compressor 140. The second compressor controller 155 may include a processor and a memory.

The cooling device 160 may cool high pressure hydrogen introduced from the high pressure vessel 150. For example, the cooling device 160 may cool the high pressure hydrogen to −40° C. The cooling device 160 may cool hydrogen by means of refrigerant circulation.

A flow control valve 161 may be connected with an output side of the cooling device 160. The flow control valve 161 may adjust a hydrogen flow rate supplied to a vehicle V which is a charging target.

A flow indicator controller (FIC) 162 may be connected with the flow control valve 161. The FIC 162 may determine an opening amount of the flow control valve 161 based on the hydrogen flow rate measured by the fourth flow element FE4 mounted on a line connecting the cooling device 160 with the flow control valve 161. In other words, the FIC 162 may control a hydrogen flow rate supplied to the vehicle V depending on the hydrogen flow rate measured by the fourth flow element FE4. The vehicle V may include a fuel cell (e.g., a polymer electrolyte membrane fuel cell (PEMFC), a solid oxide fuel cell (SOFC), or the like) which uses hydrogen as fuel.

The FIC 162 may calculate an available flow rate based on the pressure of the low pressure vessel 110 and may control a load of facility using hydrogen (e.g., a fuel cell vehicle or the like).

The medium pressure vessel 130 and the high pressure vessel 150 may be connected with the low pressure vessel 110 through a return line. The first valve 170, the second valve 180, and the hydrogen supply valve 190 may be mounted on the return line.

The first valve 170 may be located between the medium pressure vessel 130 and the hydrogen supply valve 190 to return hydrogen, discharged from the medium pressure vessel 130, to the low pressure vessel 110. The first valve 170 may be opened or closed based on the medium pressure vessel pressure. The first compressor controller 135 may determine whether it is possible for the medium pressure vessel 130 to supply hydrogen based on the medium pressure vessel pressure. When it is possible for the medium pressure vessel 130 to supply the hydrogen, the first compressor controller 135 may open the first valve 170. Meanwhile, when it is impossible for the medium pressure vessel 130 to supply the hydrogen, the first compressor controller 135 may close the first valve 170.

The second valve 180 may be located between the high pressure vessel 150 and the hydrogen supply valve 190 to return hydrogen, discharged from the high pressure vessel 150, to the low pressure vessel 110. The second valve 180 may be opened or closed based on the high pressure vessel pressure. The second compressor controller 155 may determine whether it is possible for the high pressure vessel 150 to supply hydrogen based on the high pressure vessel pressure. When it is possible for the high pressure vessel 150 to supply the hydrogen, the second compressor controller 155 may open the second valve 180. Meanwhile, when it is impossible for the high pressure vessel 150 to supply the hydrogen, the second compressor controller 155 may close the second valve 180.

The hydrogen supply valve 190 may adjust an opening amount depending on a control command output from the first PIC 115 to control the supply amount of hydrogen supplied to the low pressure vessel 110.

The above-mentioned embodiment discloses that the first compressor controller 135 and the second compressor controller 155 respectively control operations of the first valve 170 and the second valve 180, but not limited thereto. As an example, each of the first valve 170 and the second valve 180 may include a controller which controls a valve operation. As another example, one controller which controls operations of the first valve 170 and the second valve 180 may be separately provided.

Furthermore, the hydrogen refueling system may further include an upper-level controller which is connected with the respective components through a wired and/or wireless communication network to control operations of the respective components. The upper-level controller may include a processor and a memory.

Figure 2:
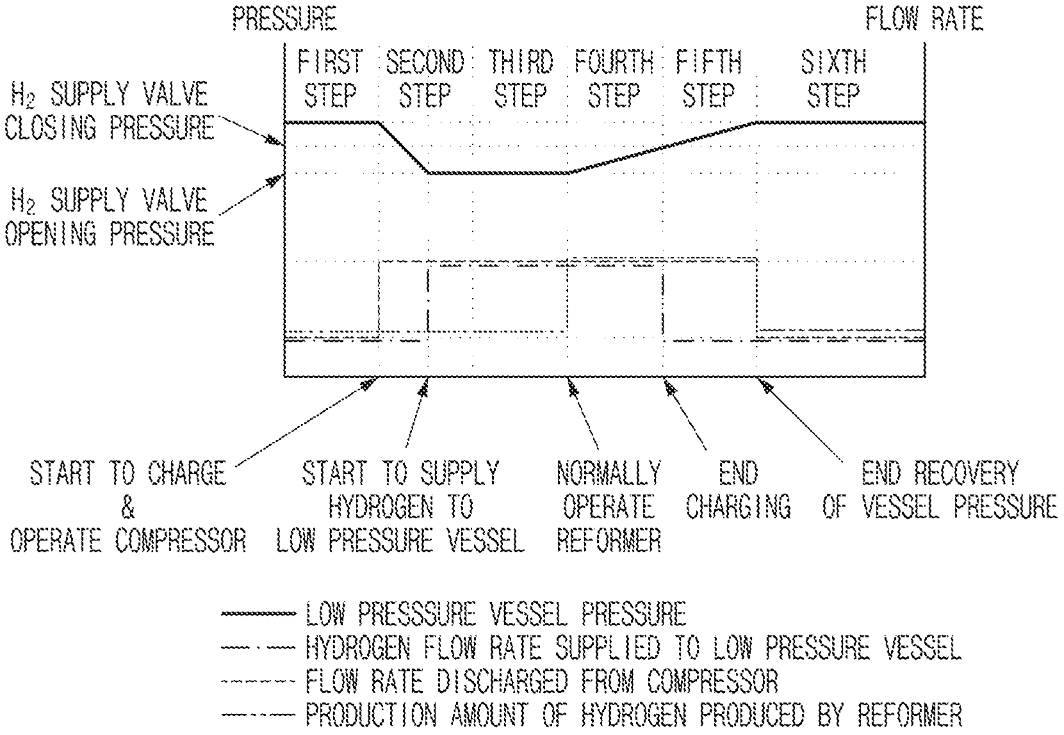
FIG. 2 is a graph illustrating a driving behavior sequence of a hydrogen refueling system according to an embodiment of the present disclosure.

FIG. 2 is a graph illustrating a driving behavior sequence of a hydrogen refueling system according to an embodiment of the present disclosure.

In a first step, when a low pressure vessel 110 of FIG. 1 maintains maximum vessel pressure (i.e., a charging state of 100%), a hydrogen refueling system may run a reformer 100 of FIG. 1 in a standby mode to maintain a standby state.

In a second step, when hydrogen starts to be charged (or supplied) to a target device (e.g., a fuel cell vehicle or the like) including a fuel cell for power generation and when a compressor 120 of FIG. 1 operates, the pressure of hydrogen in the low pressure vessel 110 (i.e., low pressure vessel pressure) may gradually decrease. When the low pressure vessel pressure reaches hydrogen ($H_2$) supply valve opening pressure, a hydrogen refueling system may start to supply hydrogen from a medium pressure vessel 130 and/or a high pressure vessel 150 of FIG. 1 to the low pressure vessel 110. When low pressure vessel pressure measured by a first pressure element PE1 of FIG. 1 is less than or equal to the hydrogen supply valve opening pressure, the hydrogen refueling system may open a hydrogen supply valve 190 of FIG. 1 to supply hydrogen, returned (or collected) from the medium pressure vessel 130 and/or the high pressure vessel 150, to the low pressure vessel 110.

In a third step, because a flow rate discharged from the compressor 120 does not decrease as hydrogen is supplied to the low pressure vessel 110, a hydrogen flow rate supplied to the medium pressure vessel 130 may fail to decrease.

In a fourth step, when the reformer 100 normally operates, the low pressure vessel pressure may be gradually recovered. The hydrogen refueling system may identify whether the low pressure vessel pressure reaches hydrogen supply valve closing pressure. When it is determined that the low pressure vessel pressure reaches the hydrogen supply valve closing pressure, the hydrogen refueling system may close the hydrogen supply valve 190 to end charging.

In a fifth step, the hydrogen refueling system may operate the reformer 100 and the compressor 120 until the pressure of the low pressure vessel 110 is recovered after the charging is ended.

In a sixth step, when the pressure of the low pressure vessel 110 is recovered, the hydrogen refueling system may stop the reformer 100 and the compressor 120. In other words, when the low pressure vessel pressure reaches the maximum vessel pressure, the hydrogen refueling system may stop operating the reformer 100 and the compressor 120 and may switch an operation mode to a standby mode.

Figure 3:
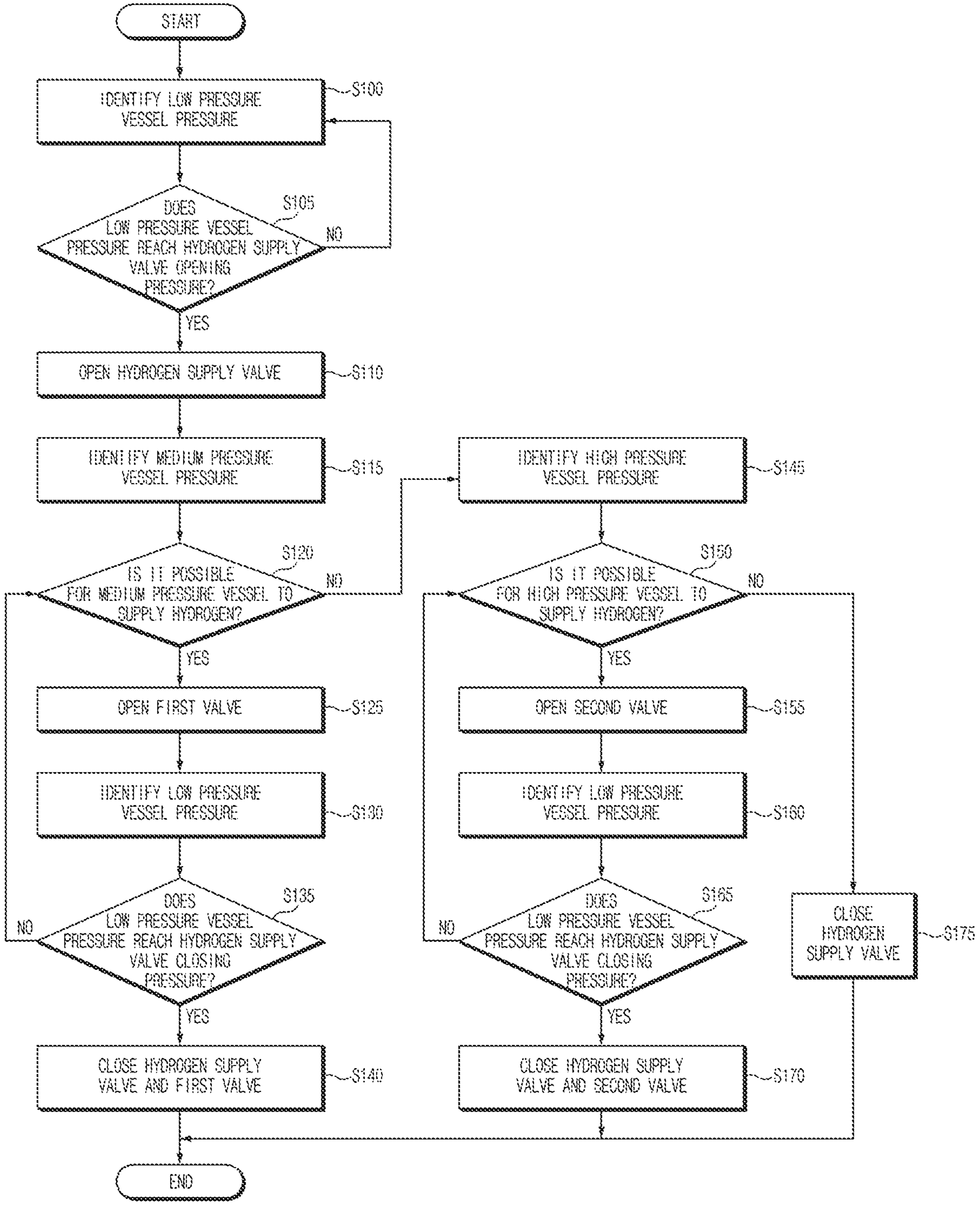
FIG. 3 is a flowchart illustrating a control method of a hydrogen refueling system according to an embodiment of the present disclosure.

FIG. 3 is a flowchart illustrating a control method of a hydrogen refueling system according to an embodiment of the present disclosure. It is described that the present embodiment is performed by an upper-level controller (hereinafter referred to as a "controller") of the hydrogen refueling system.

When hydrogen starts to be supplied to a charging target and when a compressor operates, in S100, the controller of the hydrogen refueling system may identify (or monitor) pressure of hydrogen in a low pressure vessel 110 of FIG. 1 using a first pressure element PE1 of FIG. 1. Herein, the charging target may be a vehicle including a fuel cell for power generation, and the compressor may include a medium pressure compressor 120 of FIG. 1 or the medium pressure compressor 120 and a high pressure compressor 140 of FIG. 1.

In S105, the controller may identify (or determine) whether the low pressure vessel pressure reaches hydrogen supply valve opening pressure. In other words, the controller may identify whether the low pressure vessel pressure (or the pressure of the hydrogen in the low pressure vessel 110) decreases to less than or equal to the hydrogen supply valve opening pressure.

When it is identified that the low pressure vessel pressure reaches the hydrogen supply valve opening pressure, in S110, the controller may open a hydrogen supply valve 190 of FIG. 1. When the low pressure vessel pressure measured by the first pressure element PE1 is less than or equal to the hydrogen supply valve opening pressure, the controller may control the hydrogen supply valve 190 to be opened.

In S115, the controller may identify medium pressure vessel pressure using a fourth pressure element PE4 of FIG. 1. The controller may monitor the medium pressure vessel pressure using the fourth pressure element PE4.

In S120, the controller may determine whether it is possible to supply hydrogen from a medium pressure vessel 130 of FIG. 1 to the low pressure vessel 110 based on the medium pressure vessel pressure. The controller may identify whether the medium pressure vessel pressure measured by the fourth pressure element PE4 is greater than or equal to predetermined pressure (e.g., pressure corresponding to 80% of a maximum capacity of the medium pressure vessel 130).

When it is possible for the medium pressure vessel 130 to supply the hydrogen, in S125, the controller may open a first valve 170 of FIG. 1. The controller may open the first valve 170 and may return hydrogen from the medium pressure vessel 130 to the low pressure vessel 110 to recover the pressure of the low pressure vessel 110.

In S130, the controller may supply the hydrogen of the medium pressure vessel 130 to the low pressure vessel 110 and may identify low pressure vessel pressure using the first pressure element PE1.

In S135, the controller may determine whether the low pressure vessel pressure measured by the first pressure element PE1 reaches hydrogen supply valve closing pressure. The controller may compare the low pressure vessel pressure measured by the first pressure element PE1 with the hydrogen supply valve closing pressure.

When it is determined that the low pressure vessel pressure reaches the hydrogen supply valve closing pressure, in S140, the controller may close the hydrogen supply valve 190 and the first valve 170. When it is determined that the low pressure vessel pressure is greater than the hydrogen supply valve closing pressure, the controller may switch the hydrogen supply valve 190 and the first valve 170 from an open state to a closed state.

When it is determined that it is not possible for the medium pressure vessel 130 to supply hydrogen in S120, in S145, the controller may identify (or measure) high pressure vessel pressure using a seventh pressure element PE7 of FIG. 1.

In S150, the controller may determine whether it is possible for the high pressure vessel 150 to supply hydrogen based on the high pressure vessel pressure. In other words, the controller may determine whether it is possible to supply hydrogen in the high pressure vessel 150 to the low pressure vessel 110.

When it is determined that it is possible for the high pressure vessel 150 to supply the hydrogen, in S155, the controller may open a second valve 180 of FIG. 1. The controller may open the second valve 180 and may return hydrogen from the high pressure vessel 150 to the low pressure vessel 110 to recover the pressure of the low pressure vessel 110.

After opening the second valve 180, in S160, the controller may identify low pressure vessel pressure using the first pressure element PE1. In other words, the controller may measure pressure of the low pressure vessel 110 by means of the first pressure element PE1.

In S165, the controller may determine whether the low pressure vessel pressure reaches the hydrogen supply valve closing pressure.

When it is determined that the low pressure vessel pressure reaches the hydrogen supply valve closing pressure, in S170, the controller may close the hydrogen supply valve 190 and the second valve 180.

When it is determined that it is not possible for the high pressure vessel 150 to supply the hydrogen, in S175, the controller may close the hydrogen supply valve 190. The controller may maintain a closed state of the hydrogen supply valve 190.

In the above-mentioned embodiment, the controller may return hydrogen from the medium pressure vessel 130 or the high pressure vessel 150 to the low pressure vessel 110 and may prevent the pressure of the low pressure vessel 110 from being degraded until the reformer 100 normally operates. Furthermore, the controller may quicken pressure recovery of the medium pressure vessel 130 to decrease a standby time for charging.

Figure 4:
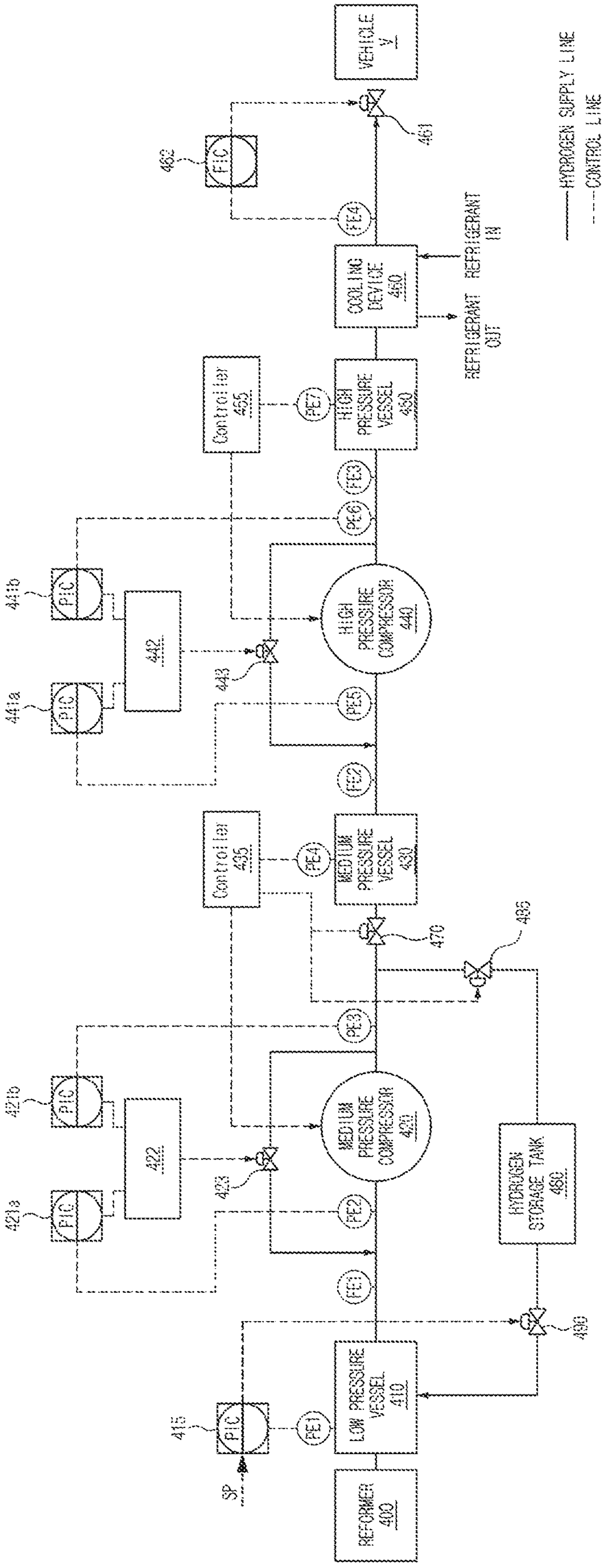
FIG. 4 is a drawing illustrating a configuration of a hydrogen refueling system according to another embodiment of the present disclosure.

FIG. 4 is a drawing illustrating a configuration of a hydrogen refueling system according to another embodiment of the present disclosure.

The hydrogen refueling system may include a reformer 400, a low pressure vessel 410, a medium pressure compressor 420, a medium pressure vessel 430, a high pressure compressor 440, a high pressure vessel 450, a cooling device 460, a third valve 470, a hydrogen storage tank 480, a fourth valve 485, and a hydrogen supply valve 490.

The reformer 400 is a hydrogen generator which produces hydrogen. The reformer 400 may generate low pressure (or first pressure) hydrogen. When the low pressure vessel 410 is charged 100%, the reformer 400 may operate in a standby mode.

The low pressure vessel (or the first vessel) 410 may be a hydrogen storage tank which stores the low pressure hydrogen produced by the reformer 400. The low pressure vessel 410 may be equipped with a first pressure sensor or element PE1 which measures pressure of hydrogen in the low pressure vessel 410 (or low pressure vessel pressure).

A first pressure indicator controller (PIC) 415 may control pressure of hydrogen in the low pressure vessel 410. The first PIC 415 may compare the hydrogen pressure measured by the first pressure element PE1 with set pressure SP. The set pressure SP may be preset by a manager or a designer of the hydrogen refueling system. When the hydrogen pressure measured by the first pressure element PE1 is less than or equal to the set pressure SP, the first PIC 415 may determine to supply hydrogen to the low pressure vessel 410. When it is determined to supply the hydrogen, the first PIC 415 may control the hydrogen supply valve 490 to be opened, such that hydrogen is supplied to the low pressure vessel 410. At this time, the first PIC 415 may control an opening amount of the hydrogen supply valve 490 based on the hydrogen pressure measured by the first pressure element PE1.

The first PIC 415 may include a processor. The processor may be implemented as an ASIC, a DSP, a PLD, an FPGA, a CPU, a microcontroller, and/or a microprocessor. The first PIC 415 may include a memory. The memory may be a non-transitory storage medium which stores instructions executed by the processor. The memory may be implemented as a flash memory, a hard disk, an SSD, a RAM card, an SRAM, a ROM, a PROM, an EEPROM, an EPROM, an/or the like.

The medium pressure compressor (or the first compressor) 420 may compress the low pressure hydrogen introduced from the low pressure vessel 410 to medium pressure (or second pressure) hydrogen. In other words, the medium pressure compressor 420 may be a device which compresses the pressure of hydrogen in the hydrogen refueling system to medium pressure. A first flow element FE1 and/or a second pressure element PE2 may be disposed at a front stage of the medium pressure compressor 420. A third pressure element PE3 may be mounted on a rear stage of the medium pressure compressor 420.

A second PIC 421*a* which controls hydrogen pressure at the front stage of the medium pressure compressor 420 and a third PIC 421*b* which controls hydrogen pressure at the rear stage of the medium pressure compressor 420 may be connected with the medium pressure compressor 420. The second PIC 421*a* may control hydrogen pressure at the front stage of the medium pressure compressor 420 based on the hydrogen pressure at the front stage, which is measured by the second pressure element PE2. The second PIC 421*a* may output a valve opening amount according to the hydrogen pressure at the front stage of the medium pressure compressor 420. The third PIC 421*b* may control hydrogen pressure at the rear stage of the medium pressure compressor 420 based on the hydrogen pressure at the rear stage, which is measured by the third pressure element PE3. The third PIC 421*b* may output a valve opening amount according to the hydrogen pressure at the rear stage of the medium pressure compressor 420.

A first selector 422 may be connected with the second PIC 421*a* and the third PIC 421*b*. The first selector 422 may select a larger value among output values output from the second PIC 421*a* and the third PIC 421*b*. In other words, the first selector 422 may select and output a larger valve opening amount between the valve opening amount output from the second PIC 421*a* and the valve opening amount output from the third PIC 421*b*. Each of the second PIC 421*a* and the third PIC 421*b* may include a processor and a memory.

A first pressure control valve 423 may be connected with the first selector 422. The first pressure control valve 423 may be installed on a bypass line connected from the rear stage of the medium pressure compressor 420 to the front stage of the medium pressure compressor 420. The first pressure control valve 423 may adjust its opening amount depending on the valve opening amount output from the first selector 422 and may control the amount of hydrogen bypassed from the rear stage of the medium pressure compressor 420 to the front stage of the medium pressure compressor 420. The first pressure control valve 423 may control the hydrogen pressure at the front stage of the medium pressure compressor 420 and the hydrogen pressure at the rear stage of the medium pressure compressor 420 by adjusting the opening amount of the first pressure control valve 423.

The medium pressure vessel (or the second vessel) 430 may store medium pressure (e.g., 450 bar) hydrogen compressed by the medium pressure compressor 420. The medium pressure vessel 430 may be equipped with a fourth pressure element PE4 which measures pressure of hydrogen in the medium pressure vessel 430 (or medium pressure vessel pressure).

A first compressor controller (or a first controller) 435 may control capacity of the medium pressure compressor 420 based on the pressure of the hydrogen in the medium pressure vessel 430, which is measured by the fourth pressure element PE4. The first compressor controller 435 may control compressor capacity by controlling RPM, a guide vane, a sliding valve, or the like of the medium pressure compressor 420. The first compressor controller 435 may include a processor and a memory.

The high pressure compressor (or the second compressor) 440 may compress the medium pressure hydrogen introduced from the medium pressure vessel 430 to high pressure (or third pressure) hydrogen. In other words, the high pressure compressor 440 may be a device which compresses the hydrogen in the hydrogen refueling system to high pressure (e.g., 875 bar). A second flow element FE2 and/or a fifth pressure element PE5 may be installed at a front stage of the high pressure compressor 440. A sixth pressure element PE6 and/or a third flow element FE3 may be mounted on a rear stage of the high pressure compressor 440.

A fourth PIC 441*a* which controls hydrogen pressure at the front stage of the high pressure compressor 440 and a fifth PIC 441*b* which controls hydrogen pressure at the rear stage of the high pressure compressor 440 may be connected with the high pressure compressor 440. The fourth PIC 441*a* may control hydrogen pressure at the front stage of the high pressure compressor 440 based on the hydrogen pressure measured by the fifth pressure element PE5. The fourth PIC 441*a* may output a valve opening amount according to the hydrogen pressure at the front stage of the high pressure compressor 440. The fifth PIC 441*b* may control hydrogen pressure at the rear stage of the high pressure compressor 440 based on the hydrogen pressure measured by the sixth pressure element PE6. The fifth PIC 441*b* may output a valve opening amount according to the hydrogen pressure at the rear stage of the high pressure compressor 440.

A second selector 442 may be connected with the fourth PIC 441*a* and the fifth PIC 441*b*. The second selector 442 may select a larger value among output values output from the fourth PIC 441*a* and the fifth PIC 441*b*. In other words, the second selector 442 may select and output a larger valve opening amount between the valve opening amount output from the fourth PIC 441*a* and the valve opening amount output from the fifth PIC 441*b*. Each of the fourth PIC 441*a* and the fifth PIC 441*b* may include a processor and a memory.

A second pressure control valve 443 may be connected with the second selector 442. The second pressure control valve 443 may be installed on a bypass line connected from the rear stage of the high pressure compressor 440 to the front stage of the high pressure compressor 440. The second pressure control valve 443 may adjust its opening amount depending on the valve opening amount output from the second selector 442. The second pressure control valve 443 may control the hydrogen pressure at the front stage of the high pressure compressor 440 and the hydrogen pressure at the rear stage of the high pressure compressor 440 by adjusting the opening amount of the second pressure control valve 443.

The high pressure vessel (or the third vessel) 450 may store the high pressure hydrogen compressed by the high pressure compressor 440. The high pressure vessel 450 may be equipped with a seventh pressure element PE7 which measures pressure of hydrogen in the high pressure vessel 450 (or high pressure vessel pressure).

A second compressor controller (or a second controller) 455 may control capacity of the high pressure compressor 440 based on the pressure of the hydrogen in the high pressure vessel 450, which is measured by the seventh pressure element PE7. The second compressor controller 455 may control compressor capacity by controlling RPM, a guide vane, a sliding valve, or the like of the high pressure compressor 440. The second compressor controller 455 may include a processor and a memory.

The cooling device 460 may cool high pressure hydrogen introduced from the high pressure vessel 450. For example, the cooling device 460 may cool the high pressure hydrogen to −40° C. The cooling device 460 may cool hydrogen by means of refrigerant circulation.

A flow control valve 461 may be connected with an output side of the cooling device 460. The flow control valve 461 may adjust a hydrogen flow rate supplied to a vehicle V which is a charging target.

A flow indicator controller (FIC) 462 may be connected with the flow control valve 461. The FIC 462 may determine an opening amount of the flow control valve 461 based on the hydrogen flow rate measured by the fourth flow element FE4 mounted on a line connecting the cooling device 460 with the flow control valve 461. In other words, the FIC 462 may control a hydrogen flow rate supplied to the vehicle V depending on the hydrogen flow rate measured by the fourth flow element FE4. The vehicle V may include a fuel cell which uses hydrogen as fuel.

The FIC 462 may calculate an available flow rate based on the pressure of the low pressure vessel 410 and may control a load of facility using hydrogen.

The third valve 470 which supplies or blocks hydrogen to or from the medium pressure vessel 430 may be installed at the front stage of the medium pressure vessel 430. The third valve 470 may be opened or closed under control of the first compressor controller 435. The first compressor controller 435 may determine to open or close the third valve 470 based on the medium pressure vessel pressure. For example, when the medium pressure vessel 430 is fully charged, the first compressor controller 435 may switch from an open state to a closed state. The third valve 470 may include a controller (e.g., a microcontroller, a microprocessor, an ASIC, an FPGA, or the like).

The rear stage of the medium compressor 420 may be connected with the low pressure vessel 410 through a return line. The hydrogen storage tank 480 and the hydrogen supply valve 490 may be mounted on the return line.

The hydrogen storage tank 480 may be connected with the rear stage of the medium pressure compressor 420 and the front stage of the medium pressure vessel 430. The hydrogen storage tank 480 may store hydrogen discharged from the medium pressure compressor 420. A tube trailer rather than the hydrogen storage tank 480 may be used. A fourth valve 485 may be installed between the hydrogen storage tank 480 and the third valve 470 and may be located between the hydrogen storage tank 480 and the medium pressure compressor 420. The fourth valve 485 may be opened or closed under an instruction of the first compressor controller 435.

The hydrogen supply valve 490 may be located between the hydrogen storage tank 480 and the low pressure vessel 410. The hydrogen supply valve 490 may adjust an opening amount depending on a control command output from the first PIC 415 to adjust the supply amount of hydrogen supplied to the low pressure vessel 410.

Furthermore, the hydrogen refueling system may further include an upper-level controller which is connected with the respective components through a wired and/or wireless communication network to control operations of the respective components. The upper-level controller may include a processor and a memory.

Figure 5:
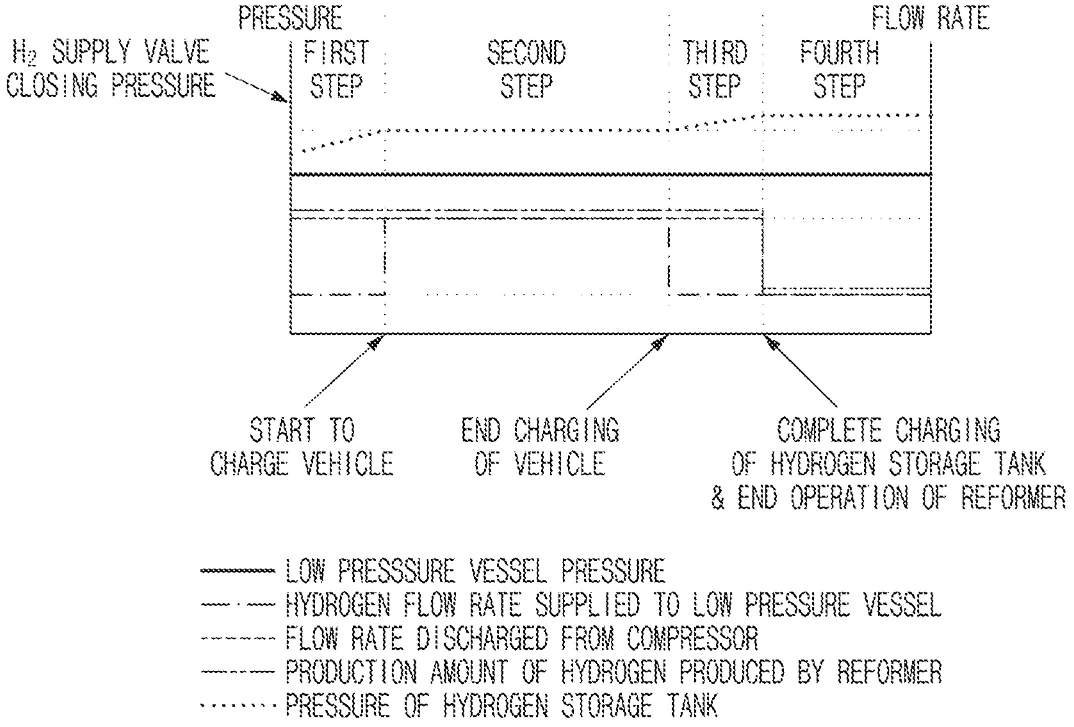
FIG. 5 is a graph illustrating a driving behavior sequence of a hydrogen refueling system according to another embodiment of the present disclosure.

FIG. 5 is a graph illustrating a driving behavior sequence of a hydrogen refueling system according to another embodiment of the present disclosure.

When a reformer 400 of FIG. 4 is operating, as in the graph illustrated in FIG. 5, pressure of a low pressure vessel 410 of FIG. 4 may be kept constant.

In a first step, because the production amount of hydrogen produced by the reformer 400 and a discharge flow rate discharged from a compressor are constant, pressure of a hydrogen storage tank 480 of FIG. 4 may gradually increase.

In a second step, when a vehicle starts to be charged, the hydrogen refueling system may increase a hydrogen flow rate supplied from the hydrogen storage tank 480 to the low pressure vessel 410. When hydrogen starts to be supplied to the vehicle which is a charging target, the hydrogen refueling system may open a hydrogen supply valve 490 of FIG. 4 such that hydrogen discharged from the hydrogen storage tank 480 is supplied to the low pressure vessel 410.

In a third step, when the charging of the vehicle is ended, the hydrogen refueling system may block hydrogen from being supplied from the hydrogen storage tank 480 to the low pressure vessel 410. When hydrogen stops being supplied to the vehicle, the hydrogen refueling system may close the hydrogen supply valve 490 to block hydrogen supplied from the hydrogen storage tank 480 to the low pressure vessel 410.

In a fourth step, when the charging of the hydrogen storage tank 480 is completed (i.e., when the hydrogen storage tank 480 is charged 100%), the hydrogen refueling system may end the operation of the reformer 400 and may stop the medium pressure compressor 420.

When the reformer 400 is not operating, the hydrogen refueling system may run as illustrated in FIG. 2

Figure 6:
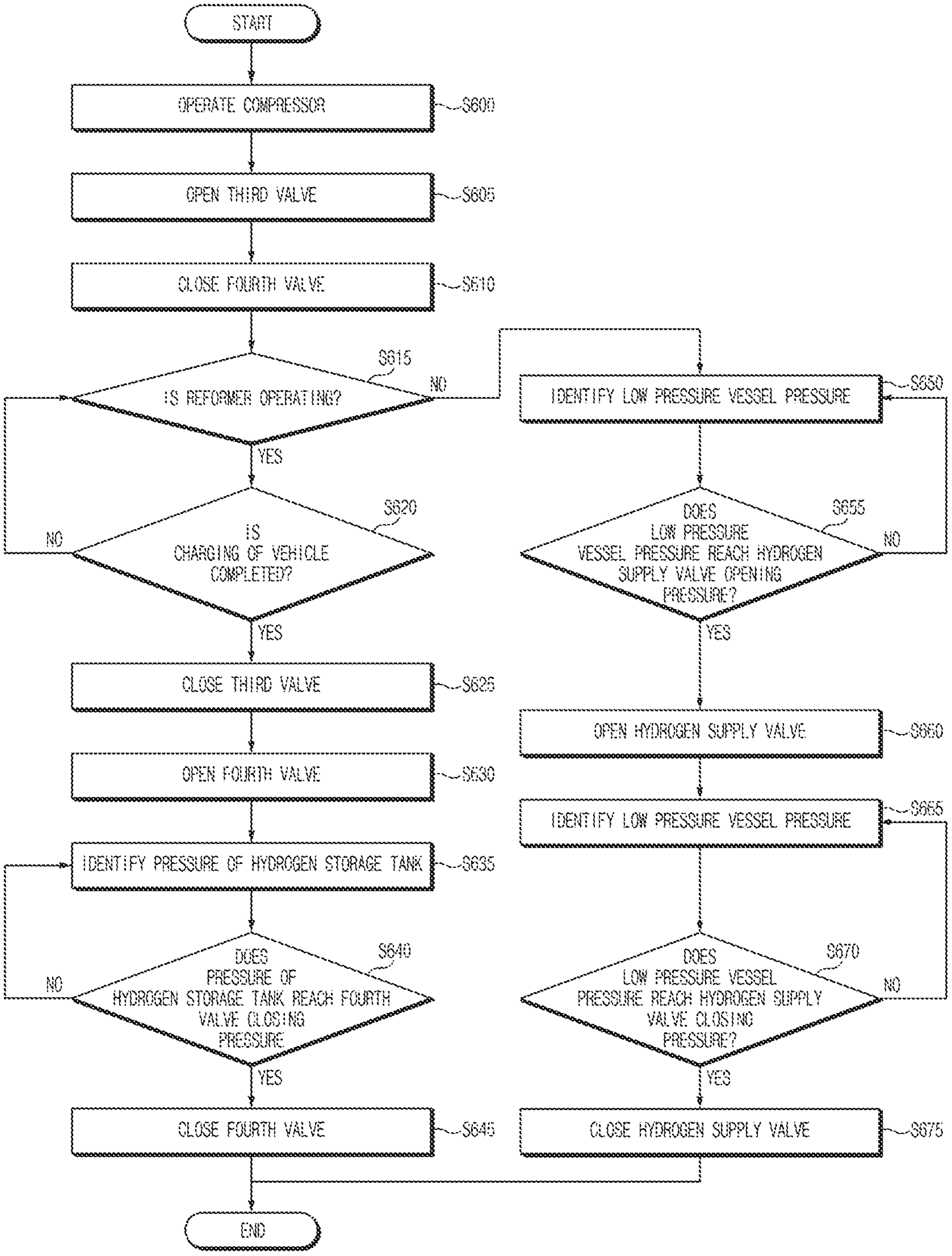
FIG. 6 is a flowchart illustrating a control method of a hydrogen refueling system according to another embodiment of the present disclosure.

FIG. 6 is a flowchart illustrating a control method of a hydrogen refueling system according to another embodiment of the present disclosure. It is described that the present embodiment is performed by an upper-level controller (hereinafter referred to as a "controller") of the hydrogen refueling system.

When hydrogen starts to be supplied to a vehicle which is a charging target, in S600, the controller may operate a compressor. The charging target may be a vehicle including a fuel cell for power generation. The controller may operate only a first compressor 420 of FIG. 4 or may operate the first compressor 420 and a second compressor 440 of FIG. 4 together.

In S605, the controller may open a third valve 470 of FIG. 4. As the third valve 470 is opened, hydrogen compressed by the first compressor 420 may be supplied to a medium pressure vessel 430 of FIG. 4.

In S610, the controller may close a fourth valve 485 of FIG. 4. As the fourth valve 485 is closed, the controller may block hydrogen discharged from the first compressor 420 from being supplied to the hydrogen storage tank 480.

In S615, the controller may identify whether the reformer 400 is operating. The controller may determine whether the reformer 400 is operating through communication with the reformer 400.

When it is identified that the reformer 400 is operating, in S620, the controller may identify whether the charging of the vehicle is completed.

When it is identified that the charging of the vehicle is completed, in S625, the controller may close the third valve 470. In other words, the medium pressure vessel 430 may block hydrogen from being supplied to the medium pressure vessel 430.

In S630, the controller may open a fourth valve 485 of FIG. 4. The controller may initiate to supply hydrogen to the hydrogen storage tank 480.

In S635, the controller may identify pressure of the hydrogen storage tank 480 using a pressure element (not shown).

In S640, the controller may determine whether the pressure of the hydrogen storage tank 480 reaches fourth valve closing pressure. The controller may compare the pressure of the hydrogen storage tank 480 with the predetermined fourth valve closing pressure.

When it is determined that the pressure of the hydrogen storage tank 480 reaches the fourth valve closing pressure, in S645, the controller may close the fourth valve 485. When the pressure of the hydrogen storage tank 480 is greater than or equal to the fourth valve closing pressure, the controller may close the fourth valve 485 to stop supplying the hydrogen to the hydrogen storage tank 480.

When it is identified that the reformer 400 is not operating, in S650, the controller may identify low pressure vessel pressure. The controller may measure low pressure vessel pressure using a first pressure element PE1 of FIG. 4.

In S655, the controller may determine whether the low pressure vessel pressure reaches hydrogen supply valve opening pressure.

When it is determined that the low pressure vessel pressure reaches the hydrogen supply valve opening pressure, in S660, the controller may open a hydrogen supply valve 490 of FIG. 4. As the hydrogen supply valve 490 is opened, the supply of hydrogen from the hydrogen storage tank 480 to the low pressure vessel 410 may be performed.

In S665, the controller may identify low pressure vessel pressure using the first pressure element PE1.

In S670, the controller may identify whether the low pressure vessel pressure reaches hydrogen supply valve closing pressure.

When it is identified that the low pressure vessel pressure reaches the hydrogen supply valve closing pressure, in S675, the controller may close the hydrogen supply valve 490. As the hydrogen supply valve 490 is closed, the supply of hydrogen from the hydrogen storage tank 480 to the low pressure vessel 410 may be blocked.

In the above-mentioned embodiment, the hydrogen storage tank 480 may be installed to prevent pressure at the front stage of the first compressor 420 from being degraded. Furthermore, when the charging of the medium pressure vessel 430 is completed, the controller may store hydrogen in the hydrogen storage tank 480.

Furthermore, compared with the embodiments disclosed in FIGS. 1 to 3, the hydrogen refueling system may decrease a standby time for charging without additional pressure degradation of the medium pressure vessel 430.

Furthermore, the hydrogen refueling system may immediately supply hydrogen to the low pressure vessel 410 without a standby time until the reformer 400 normally operates by applying the hydrogen storage tank 480, thus decreasing a pressure recovery time of the low pressure vessel 410.

Embodiments of the present disclosure may decrease a recovery time of hydrogen refueling facility linked with a reformer, that is, a standby time for charging, thus charging many hydrogen fuel cell vehicles in the same time.

Furthermore, embodiments of the present disclosure may facilitate efficient running by means of control standardization of a reformer, a fuel cell, and hydrogen refueling facility.

Furthermore, embodiments of the present disclosure may return hydrogen from a medium pressure vessel and/or a high pressure vessel, thus preventing pressure of a low pressure vessel from being degraded until a reformer normally operates.

Furthermore, embodiments of the present disclosure may prevent pressure at a front stage of a compressor from being degraded by installing a hydrogen storage tank between a rear stage of the compressor and the low pressure vessel.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

The invention claimed is:

1. A hydrogen refueling system, comprising:
- a first vessel configured to store hydrogen generated by a hydrogen generator;
- a first compressor configured to compress the hydrogen stored in the first vessel;
- a second vessel configured to store the hydrogen compressed by the first compressor;
- a hydrogen supply valve positioned between the first vessel and the second vessel; and
- a controller configured to:
  - identify a pressure of the first vessel when it is determined that a charging target has initiated and the first compressor is operating; and
  - control the hydrogen supply valve to supply the hydrogen from the second vessel to the first vessel based on whether the pressure of the first vessel is less than or equal to set pressure.

2. The hydrogen refueling system of claim 1, further comprising:
- a first valve disposed between the hydrogen supply valve and the second vessel.

3. The hydrogen refueling system of claim 2, wherein the controller is configured to:
- determine whether it is possible to supply the hydrogen from the second vessel to the first vessel based on pressure of the second vessel; and
- open the first valve such that the hydrogen of the second vessel is returned to the first vessel in response to determining that it is possible to supply the hydrogen from the second vessel to the first vessel.

4. The hydrogen refueling system of claim 3, wherein the controller is further configured to:
- identify whether the pressure of the first vessel reaches a hydrogen supply valve closing pressure; and
- close the hydrogen supply valve and the first valve in response to identifying that the pressure of the first vessel reaches the hydrogen supply valve closing pressure.

5. The hydrogen refueling system of claim 1, further comprising:
- a second compressor configured to compress the hydrogen stored in the second vessel;
- a third vessel configured to store the hydrogen compressed by the second compressor; and
- a second valve disposed between the third vessel and the hydrogen supply valve.

6. The hydrogen refueling system of claim 5, wherein the controller is further configured to:
- determine whether it is possible to supply hydrogen from the third vessel to the first vessel based on a pressure of the third vessel; and
- open the second valve such that the hydrogen of the third vessel is returned to the first vessel in response to determining that it is possible to supply the hydrogen from the third vessel to the first vessel.

7. The hydrogen refueling system of claim 5, wherein the controller is further configured to:
- identify whether the pressure of the first vessel reaches a hydrogen supply valve closing pressure; and
- close the hydrogen supply valve and the second valve in response to identifying that the pressure of the first vessel reaches the hydrogen supply valve closing pressure.

8. The hydrogen refueling system of claim 1, further comprising:
- a hydrogen storage tank connected with a rear stage of the first compressor and a front stage of the second vessel;
- a third valve disposed between the first compressor the second vessel; and
- a fourth valve disposed between the first compressor and the hydrogen storage tank.

9. The hydrogen refueling system of claim 8, wherein the controller is further configured to:
- open the third valve and to close the fourth valve to supply the hydrogen compressed by the first compressor to the second vessel based on whether the first compressor operates.

10. The hydrogen refueling system of claim 9, wherein the controller is further configured to:
- determine whether the charging of the charging target is completed based on whether the hydrogen generator is operating;
- close the third valve to block hydrogen from being supplied to the second vessel in response to determining that the charging of the charging target is completed;

open the fourth valve to supply the hydrogen compressed by the first compressor to the hydrogen storage tank; and control the hydrogen supply valve based on pressure of the hydrogen storage tank.

11. A control method of a hydrogen refueling system including a first vessel configured to store hydrogen generated by a hydrogen generator, a first compressor configured to compress the hydrogen introduced from the first vessel, and a second vessel configured to store the hydrogen compressed by the first compressor, the control method comprising:

identifying, by a controller, a pressure of the first vessel when it is determined that a charging target has initiated and the first compressor is operating;

determining, by the controller, whether the pressure of the first vessel is less than or equal to a set pressure; and controlling, by the controller, a hydrogen supply valve positioned between the first vessel and the second vessel such that the hydrogen is supplied from the second vessel to the first vessel in response to determining that the pressure of the first vessel is less than or equal to the set pressure.

12. The control method of claim 11, further comprising:

initiating, by the controller, to supply the hydrogen compressed by the first compressor to the second vessel when the first compressor operates;

identifying, by the controller, whether the hydrogen generator is operating;

determining, by the controller, whether the charging of the charging target is completed in response to identifying that the hydrogen generator is operating;

blocking, by the controller, hydrogen from being supplied to the second vessel in response to determining that the charging of the charging target is completed;

supplying, by the controller, the hydrogen compressed by the first compressor to a hydrogen storage tank disposed between a rear stage of the first compressor and the hydrogen supply valve; and blocking, by the controller, the hydrogen from being supplied to the hydrogen storage tank based on a pressure of the hydrogen storage tank.

13. The control method of claim 11, further comprising:

determining, by the controller, whether it is possible to supply the hydrogen from the second vessel to the first vessel based on a pressure of the second vessel;

returning, by the controller, the hydrogen of the second vessel to the first vessel in response to determining that it is possible to supply the hydrogen from the second vessel to the first vessel;

identifying, by the controller, whether the pressure of the first vessel reaches a hydrogen supply valve closing pressure; and closing, by the controller, the hydrogen supply valve and a first valve in response to identifying that the pressure of the first vessel reaches the hydrogen supply valve closing pressure.

14. The control method of claim 13, wherein the returning of the hydrogen of the second vessel to the first vessel includes:

opening, by the controller, the first valve positioned between the hydrogen supply valve and the second vessel.

15. The control method of claim 11, further comprising:

determining, by the controller, whether it is possible to supply hydrogen from a third vessel connected with a rear stage of a second compressor configured to compress the hydrogen discharged from the second vessel, and configured to store hydrogen compressed by the second compressor to the first vessel based on pressure of the third vessel;

returning, by the controller, the hydrogen of the third vessel to the first vessel in response to determining that it is possible to supply the hydrogen from the third vessel to the first vessel;

identifying, by the controller, whether the pressure of the first vessel reaches a hydrogen supply valve closing pressure; and closing, by the controller, the hydrogen supply valve and a second valve in response to identifying that the pressure of the first vessel reaches the hydrogen supply valve closing pressure.

16. The control method of claim 15, wherein the returning of the hydrogen of the third vessel to the first vessel includes:

opening, by the controller, the second valve positioned between the hydrogen supply valve and the third vessel.

17. The control method of claim 12, further comprising:

controlling, by the controller, the hydrogen supply valve based on the pressure of the hydrogen storage tank.

18. The control method of claim 12, wherein initiating to supply the hydrogen to the second vessel includes:

opening, by the controller, a third valve positioned between the first compressor and the second vessel based on whether the first compressor operates; and closing, by the controller, a fourth valve located between the rear stage of the first compressor and the hydrogen storage tank.

19. The control method of claim 18, wherein the blocking of the hydrogen from being supplied to the second vessel includes:

closing, by the controller, the third valve.

20. The control method of claim 18, wherein the supplying of the hydrogen to the hydrogen storage tank includes:

opening, by the controller, the fourth valve.

* * * * *